(12) United States Patent
Shiratori et al.

(10) Patent No.: US 11,366,377 B2
(45) Date of Patent: Jun. 21, 2022

(54) WAVELENGTH CONVERSION ELEMENT, ILLUMINATION DEVICE, AND PROJECTOR

(71) Applicant: SEIKO EPSON CORPORATION, Tokyo (JP)

(72) Inventors: Koya Shiratori, Matsumoto (JP); Mizuha Hiroki, Matsumoto (JP); Ryuta Koizumi, Shiojiri (JP); Tetsuo Shimizu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/208,179

(22) Filed: Mar. 22, 2021

(65) Prior Publication Data

US 2021/0294192 A1    Sep. 23, 2021

(30) Foreign Application Priority Data

Mar. 23, 2020   (JP) .............................. JP2020-051194

(51) Int. Cl.
*G03B 21/20* (2006.01)
*G03B 33/12* (2006.01)

(52) U.S. Cl.
CPC ....... *G03B 21/204* (2013.01); *G03B 21/2066* (2013.01); *G03B 33/12* (2013.01)

(58) Field of Classification Search
None
See application file for complete search history.

(56) References Cited

U.S. PATENT DOCUMENTS

| 2011/0198645 | A1 | 8/2011 | Jo et al. | |
| 2014/0268063 | A1* | 9/2014 | Akiyama | G03B 21/204 |
| | | | | 353/20 |
| 2016/0061391 | A1* | 3/2016 | Inoue | F21V 13/14 |
| | | | | 362/84 |
| 2018/0373132 | A1 | 12/2018 | Miyazaki | |
| 2019/0302588 | A1* | 10/2019 | Yanai | G02B 5/0284 |

FOREIGN PATENT DOCUMENTS

| JP | 2012-064989 A | 3/2012 | |
| JP | 2017-194523 A | 10/2017 | |
| JP | 2017-215549 A | 12/2017 | |
| JP | 2019-008193 A | 1/2019 | |
| WO | WO-2019008872 A1 * | 1/2019 | ............... F21V 9/40 |

* cited by examiner

*Primary Examiner* — Michelle M Iacoletti
*Assistant Examiner* — Danell L Owens
(74) *Attorney, Agent, or Firm* — Oliff PLC

(57) ABSTRACT

A wavelength conversion element according to the present disclosure includes a substrate, a reflecting layer, a wavelength conversion layer which is disposed on the reflecting layer, and which is configured to convert light in a first wavelength band into light in a second wavelength band, a structure which is disposed on the wavelength conversion layer, and which is configured to scatter the light in the first wavelength band, and an optical layer which is disposed on the structure, and which is configured to reflect a part of the light in the first wavelength band, transmit another part of the light in the first wavelength band, and transmit the light in the second wavelength band, wherein the optical layer is different in reflectance with respect to the light in the first wavelength band in accordance with an incidence angle of the light in the first wavelength band entering the optical layer.

14 Claims, 7 Drawing Sheets

WAVELENGTH CONVERSION ELEMENT, ILLUMINATION DEVICE, AND PROJECTOR

The present application is based on, and claims priority from JP Application Serial Number 2020-051194, filed Mar. 23, 2020, the disclosure of which is hereby incorporated by reference herein in its entirety.

BACKGROUND

1. Technical Field

The present disclosure relates to a wavelength conversion element, an illumination device, and a projector.

2. Related Art

In the past, there has been an illumination device which scatters and reflects a part of light having a first wavelength with a light diffusion surface provided to a surface of a wavelength conversion layer, and then combines fluorescence having a second wavelength obtained by performing wavelength conversion on the light having the first wavelength having entered the wavelength conversion layer and the light having the first wavelength thus scattered and reflected with each other to thereby emit white illumination light (see, e.g., JP-A-2017-215549).

However, in the illumination device described above, since the scattering angle of the light having the first wavelength is not sufficient, and there is a room for improving control of a scattering characteristic, there is a problem that it is unachievable to efficiently extract the light having the first wavelength as the illumination light, and thus, the light use efficiency decreases.

SUMMARY

In view of the problems described above, according to a first aspect of the present disclosure, there is provided a wavelength conversion element including a substrate having a first surface, a reflecting layer provided to the first surface, a wavelength conversion layer which is disposed on the reflecting layer, and which is configured to convert light in a first wavelength band into light in a second wavelength band different from the first wavelength band, a structure which is disposed on the wavelength conversion layer, and which is configured to scatter the light in the first wavelength band, and an optical layer which is disposed on the structure, and which is configured to reflect a part of the light in the first wavelength band, transmit another part of the light in the first wavelength band, and transmit the light in the second wavelength band, wherein the optical layer is different in reflectance with respect to the light in the first wavelength band in accordance with an incidence angle of the light in the first wavelength band entering the optical layer.

According to a second aspect of the present disclosure, there is provided an illumination device including the wavelength conversion element according to the first aspect, a light source configured to emit the light in the first wavelength band, and a reflecting member configured to reflect the light in the first wavelength band emitted from the light source, toward the wavelength conversion element.

According to a third aspect of the present disclosure, there is provided a projector including the illumination device according to the second aspect of the present disclosure, a light modulation device configured to modulate the light from the illumination device in accordance with image information, and a projection optical device configured to project the light modulated by the light modulation device.

DESCRIPTION OF AN EXEMPLARY EMBODIMENT

An embodiment of the present disclosure will hereinafter be described using the drawings.

A projector according to the present embodiment is an example of a projector using liquid crystal panels as light modulation devices.

It should be noted that in each of the drawings described below, the constituents are shown with the scale ratios of respective sizes set differently between the constituents in some cases in order to facilitate the visualization of each of the constituents.

Figure 1:
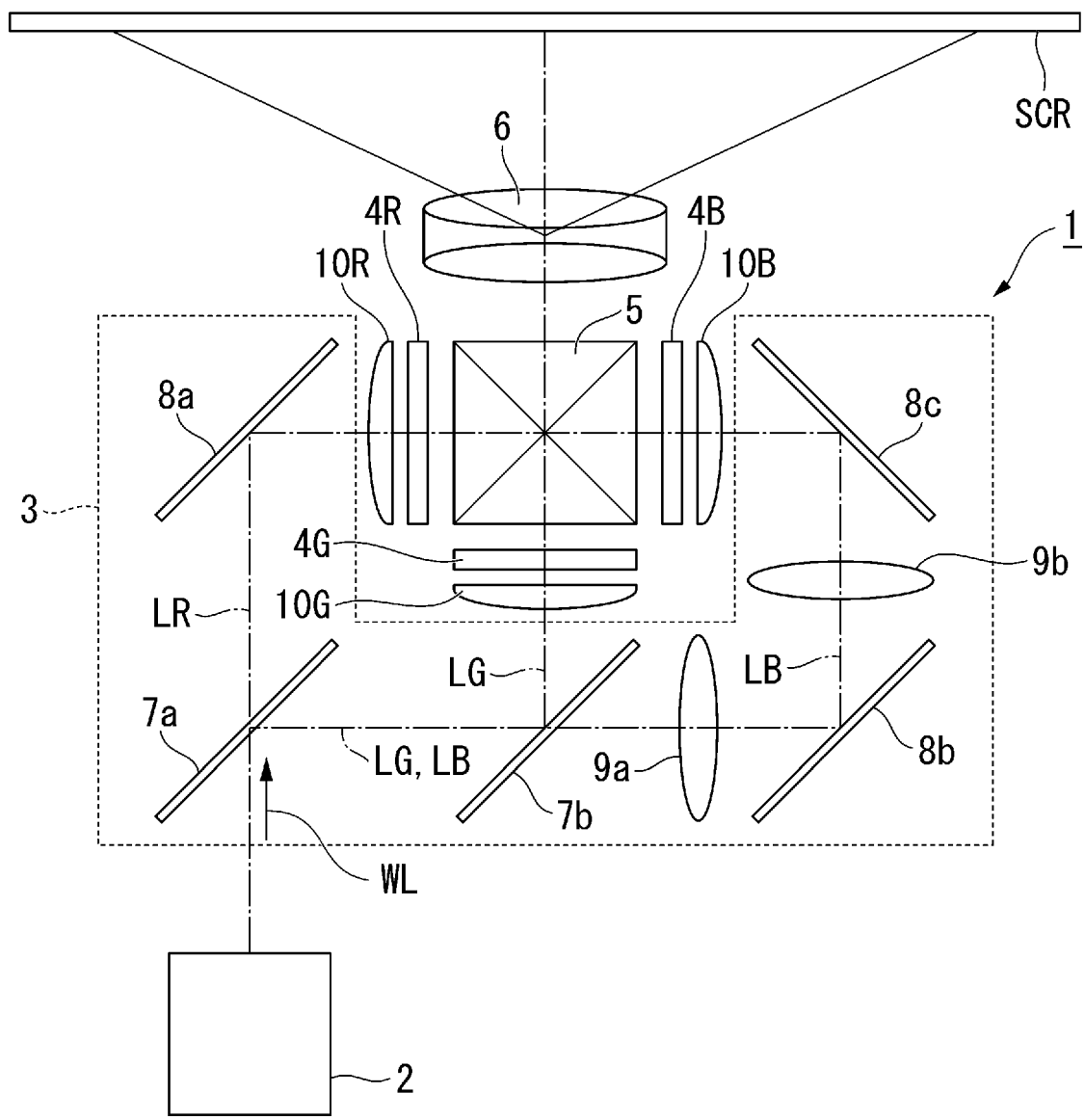
FIG. 1 is a diagram showing a configuration of a projector.

FIG. 1 is a diagram showing a configuration of the projector according to the present embodiment.

The projector 1 according to the present embodiment shown in FIG. 1 is a projection-type image display device for displaying a color image on a screen (a projection target surface) SCR. The projector 1 uses three light modulation devices corresponding to respective colored light beams, namely red light LR, green light LG, and blue light LB.

The projector 1 is provided with an illumination device 2, a color separation optical system 3, a light modulation device 4R, a light modulation device 4G, a light modulation device 4B, a combining optical system 5, and a projection optical device 6.

The illumination device 2 emits illumination light WL having a white color toward the color separation optical system 3. The color separation optical system 3 separates the illumination light WL having a white color into the red light LR, the green light LG, and the blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a, and a second relay lens 9b.

The first dichroic mirror 7a separates the illumination light WL from the illumination device 2 into the red light LR and the other light (the green light LG and the blue light LB). The first dichroic mirror 7a transmits the red light LR thus separated from, and at the same time reflects the other light (the green light LG and the blue light LB). Meanwhile, the second dichroic mirror 7b separates the other light into the green light LG and the blue light LB. The second dichroic mirror 7b reflects the green light LG thus separated from and transmits the blue light LB.

The first reflecting mirror 8a is disposed in the light path of the red light LR, and the red light LR which has been transmitted through the first dichroic mirror 7a is reflected by the first reflecting mirror 8a toward the light modulation device 4R. Meanwhile, the second reflecting mirror 8b and the third reflecting mirror 8c are disposed in the light path of the blue light LB, and the blue light LB which has been transmitted through the second dichroic mirror 7b is reflected by the second reflecting mirror 8b and the third reflecting mirror 8c toward the light modulation device 4B. Further, the green light LG is reflected by the second dichroic mirror 7b toward the light modulation device 4G.

The first relay lens 9a and the second relay lens 9b are disposed at the light exit side of the second dichroic mirror 7b in the light path of the blue light LB. The first relay lens 9a and the second relay lens 9b correct a difference in illuminance distribution of the blue light LB due to the fact that the blue light LB is longer in optical path length than the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, at the incident side and the exit side of the liquid crystal panel, there are disposed polarization plates (not shown), respectively, and thus, there is formed a configuration of transmitting only the linearly polarized light with a specific direction.

At the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate principal rays of the red light LR, the green light LG, and the blue light LB which enter the light modulation device 4R, the light modulation device 4G, and the light modulation device 4B, respectively.

The combining optical system 5 combines the image light corresponding respectively to the red light LR, the green light LG, and the blue light LB with each other in response to incidence of the image light respectively emitted from the light modulation device 4R, the light modulation device 4G, and the light modulation device 4B, and then emits the image light thus combined toward the projection optical device 6. As the combining optical system 5, there is used, for example, a cross dichroic prism.

The projection optical device 6 is constituted by a plurality of projection lenses. The projection optical device 6 projects the image light having been combined by the combining optical system 5 toward the screen SCR in an enlarged manner. Thus, an image is displayed on the screen SCR.

An example of the illumination device 2 according to the present embodiment will be described.

Figure 2:
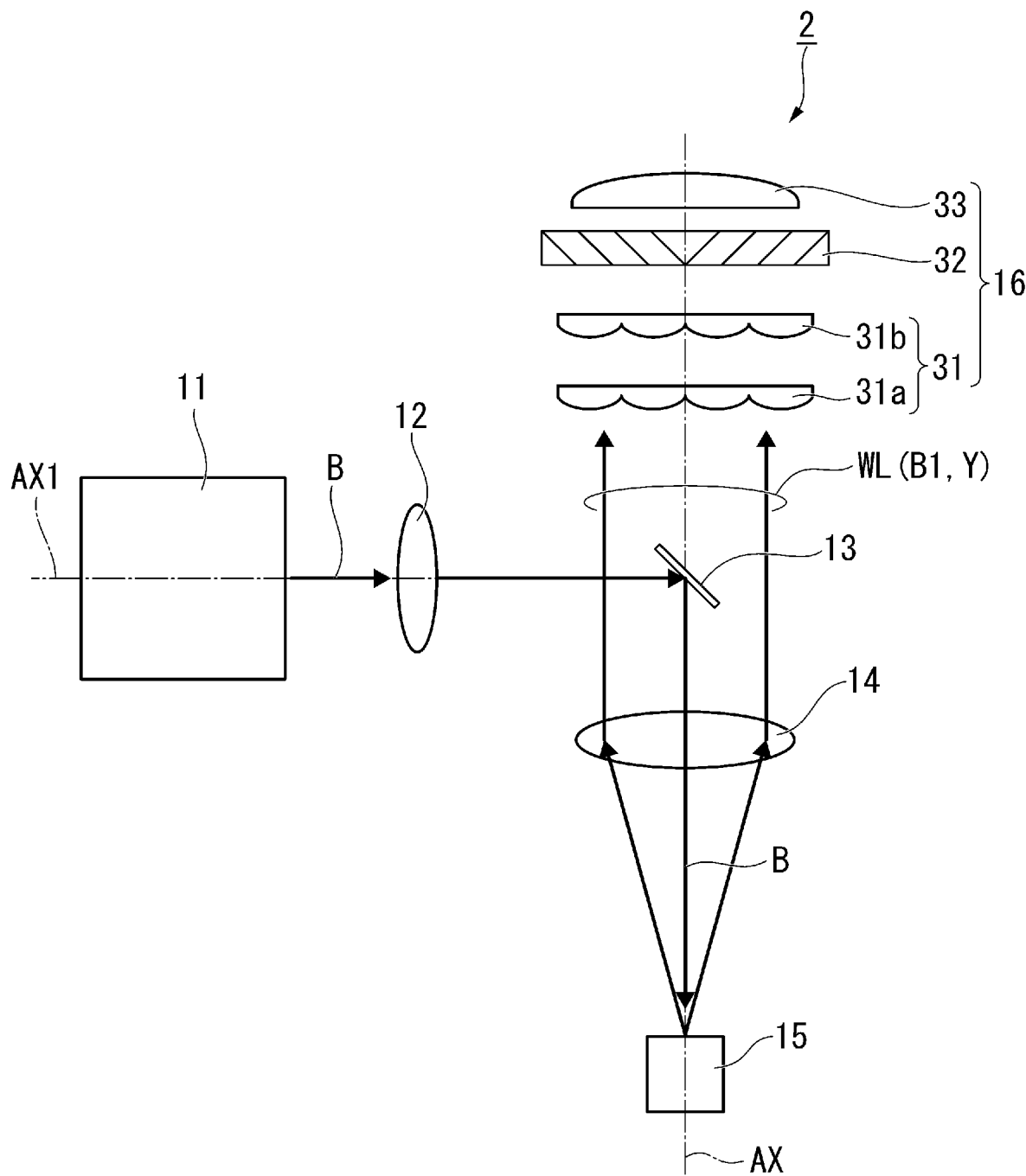
FIG. 2 is a diagram showing a schematic configuration of an illumination device.

FIG. 2 is a diagram showing a schematic configuration of the illumination device 2.

As shown in FIG. 2, the illumination device 2 is provided with a light source 11, a first optical system 12, a dichroic mirror (a reflecting member) 13, a second optical system 14, a wavelength conversion element 15, a homogenized illumination optical system 16. The light source 11, the first optical system 12, and the dichroic mirror 13 are arranged along a first light axis AX1. The wavelength conversion element 15, the second optical system 14, the dichroic mirror 13, and the homogenized illumination optical system 16 are arranged along the illumination light axis AX of the illumination device 2. The first light axis AX1 and the illumination light axis AX are perpendicular to each other.

The light source 11 emits first light B. A first wavelength band of the first light B is in a range of, for example, 450 through 460 nm, and the peak wavelength of the emission intensity is, for example, 455 nm. Therefore, the first light B is blue light. The light source 11 is formed of at least one semiconductor laser 11a. It is possible for the semiconductor laser 11a to emit the first light B having a peak wavelength other than 455 nm. The light source 11 includes a collimator lens (not shown) disposed so as to correspond to the semiconductor laser 11a. Thus, the light source 11 converts the first light B emitted from the semiconductor laser 11a into parallel light, and then emits the parallel light.

The first light B emitted from the light source 11 enters the first optical system 12. The first optical system 12 includes at least one convex lens, and makes the first light B enter the dichroic mirror 13 in a condensed state.

The dichroic mirror 13 is disposed at a focal point of the first optical system 12 or in the vicinity of the focal point. Thus, the first light B enters the dichroic mirror 13 in the state of being condensed to have a substantially minimized beam diameter. By making the first light B enter the dichroic mirror 13 in the condensed state as described above, it is possible to reduce the size of the dichroic mirror 13.

The dichroic mirror 13 has an optical characteristic of reflecting the first light B having a first wavelength band and transmitting second light Y which is emitted from a wavelength conversion element 15 described later, and which has a second wavelength band. The dichroic mirror 13 is formed of a dielectric multilayer film.

The first light B reflected by the dichroic mirror 13 enters the second optical system 14. The second optical system 14 includes at least one convex lens to collimate the first light B which enters the second optical system 14 as diverging light. The first light B collimated by the second optical system 14 enters the wavelength conversion element 15. In other words, in the present embodiment, the first light B enters the wavelength conversion element 15 as parallel light.

Figure 3:
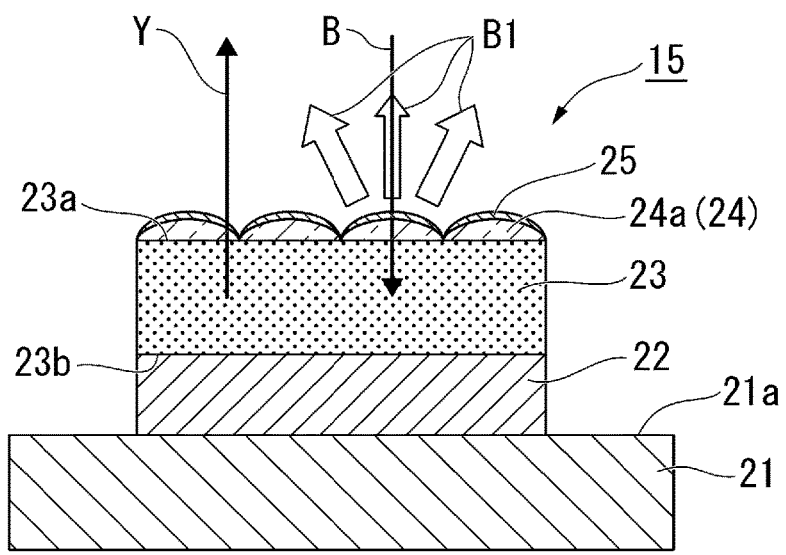
FIG. 3 is a cross-sectional view showing a configuration of a wavelength conversion element.

FIG. 3 is a cross-sectional view showing a configuration of the wavelength conversion element 15.

As shown in FIG. 3, the wavelength conversion element 15 is provided with a substrate 21, a reflecting layer 22, a wavelength conversion layer 23, a structure 24, and a half mirror layer (an optical layer) 25. The substrate 21 has an upper surface (a first surface) 21a. The substrate 21 is a support substrate for supporting the reflecting layer 22, the wavelength conversion layer 23, the structure 24, and the half mirror layer 25, and is further a radiation substrate for radiating heat transferred from the wavelength conversion layer 23. The substrate 21 can be formed of a material having high thermal conductivity such as metal or ceramics.

The reflecting layer 22 is disposed on the first surface 21a of the substrate 21. In other words, the reflecting layer 22 is located between the substrate 21 and the wavelength conversion layer 23, and reflects the fluorescence entering the reflecting layer 22 from the wavelength conversion layer 23 toward the wavelength conversion layer 23. The reflecting layer 22 is formed of a laminated film including a dielectric multilayer film, a metal mirror, a reflection enhancing film, and so on.

The wavelength conversion layer 23 is disposed on the reflecting layer 22. The wavelength conversion layer 23 has an upper surface 23a which the first light B enters, and a lower surface 23b different from the upper surface 23a. The wavelength conversion layer 23 converts the first light B in the first wavelength band into the second light Y having the second wavelength band different from the first wavelength band.

The wavelength conversion layer 23 can include a ceramic phosphor, or can also include a single crystal phosphor. The second wavelength band is in a range of, for example, 500 through 680 nm. Therefore, the second light Y is yellow light including a green light component and a red light component.

The wavelength conversion layer 23 includes, for example, yttrium aluminum garnet (YAG) type phosphor. Citing YAG:Ce including cerium (Ce) as an activator agent as an example, as the wavelength conversion layer 23, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process. It should be noted that it is desirable to use a porous sintered body as the wavelength conversion layer 23 from a viewpoint of light use efficiency, since in that case, the light is scattered inside the phosphor, and is difficult to propagate toward the lateral direction.

The structure 24 is disposed on the upper surface 23a of the wavelength conversion layer 23 to scatter a part of the first light B. The structure 24 has a plurality of scattering structures 24a. The scattering structures 24a in the present embodiment each have a lens shape formed of a protruding part.

In the present embodiment, the structure 24 is formed of a separate body from the wavelength conversion layer 23. A method of forming a dielectric body using, for example, an evaporation process, a sputtering process, a CVD process, or a coating process, and then processing the dielectric body using photolithography is suitable for the structure 24 in the present embodiment. Besides the above, it is possible to use a printing process or a transfer process such as nano-imprint. It is preferable for the structure 24 to be formed of a material which is low in light absorption and is chemically stable. In other words, the structure 24 is formed of a material having a refractive index in a range of 1.3 through 2.5, and there can be used, for example, $SiO_2$, SiON, or $TiO_2$. For example, when forming the structure 24 using SiO2, it is possible to accurately process the structure 24 using wet or dry etching.

The half mirror layer 25 is disposed on the structure 24, and reflects apart of the first light B, transmits another part of the first light B, and transmits the second light Y. Regarding the reflectance of the half mirror layer 25, the reflectance and the wavelength characteristic can be designed with a high degree of freedom in accordance with the material and the layer configuration.

The half mirror layer 25 is formed using, for example, an evaporation process, a sputtering process, a CVD process, or a coating process. In particular, an ALD (Atomic Layer Deposition) process is preferable since it is possible to evenly deposit the half mirror layer 25 on a tilted surface of the structure 24. It should be noted that in other deposition methods than the ALD process, the adhesion probability of the deposition particles is different between a flat part and a tilted part, and therefore, there occurs a film thickness distribution in some cases. However, by making a film design taking the film thickness distribution caused between the flat part and the tilted part into consideration, it is possible to form the desired half-mirror layer 25.

The half mirror layer 25 in the present embodiment is formed of a dielectric multilayer film in order to suppress the light absorption. As the material used for the dielectric multilayer film, it is preferable to use one of materials which are chemically stable, and are used commonly such as $MgF_2$, $SiO_2$, $Al_2O_3$, $Y_2O_3$, $CeO_2$, $HfO_2$, $La_2O_3$, $ZrO_2$, $Ta_2O_5$, $Nb_2O_5$, and $TiO_2$. It should be noted that $MgF_2$, $SiO_2$ are suitable as a low refractive index material, and $Al_2O_3$, $Y_2O_3$, $CeO_2$, $HfO_2$, $La_2O_3$, $ZrO_2$, $Ta_2O_5$, $Nb_2O_5$, and $TiO_2$ are suitable as a middle through high refractive index material. The half mirror layer 25 in the present embodiment is formed of a dielectric multilayer film obtained by alternately stacking, for example, a plurality of layers of $SiO_2$ and a plurality of layers of $TiO_2$.

As shown in FIG. 3, the first light B enters the wavelength conversion element 15 as the parallel light. Apart of the first light B is reflected toward a variety of directions by the structure 24 disposed on the upper surface 23a of the wavelength conversion layer 23 and the half mirror layer 25.

The half mirror layer 25 in the present embodiment is different in reflectance with respect to the first light B in accordance with the incidence angle of the first light B which enters the half mirror layer 25. Here, the incidence angle of the light which enters the half mirror layer 25 is defined by an angle formed with a direction perpendicular to the half mirror layer 25. In other words, the state in which the incidence angle to the half mirror layer 25 is 0 degree means the state in which the light enters the surface of the half mirror layer 25 from the perpendicular direction.

Then, an optical characteristic of the half mirror layer 25 in the present embodiment will be described with reference to FIG. 4 through FIG. 6.

Figure 4:
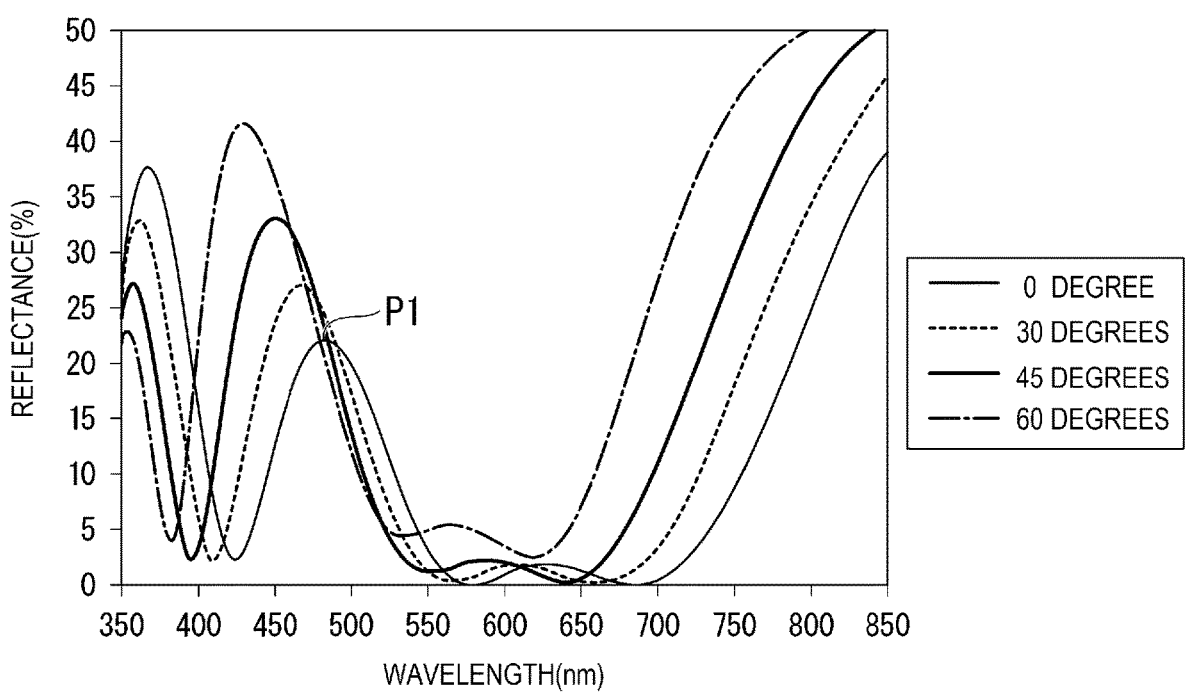
FIG. 4 is a diagram showing a surface reflectance spectrum of a half mirror layer.

FIG. 4 is a diagram showing a surface reflectance spectrum of the half mirror layer 25. FIG. 4 shows the reflectance on the surface of the half mirror layer 25 with respect to the light which enters the surface of the half mirror layer 25 at a predetermined incidence angle.

In FIG. 4, the horizontal axis represents the wavelength of the light which enters the half mirror layer 25, and the vertical axis represents the reflectance on the surface of the half mirror layer 25. It should be noted that in FIG. 4, there are shown the reflectance values of the light which enters the surface at the incidence angles of 0 degree, 30 degrees, 45 degrees, and 60 degrees, respectively.

As shown in FIG. 4, the half mirror layer 25 in the present embodiment has a peak value of the reflectance with respect to the light beam in the perpendicular direction in the half mirror layer 25 between the first wavelength band (450 through 460 nm) of the first light B and the second wavelength band (500 through 680 nm) of the second light Y. In other words, the half mirror layer 25 is designed to have the peak P1 of the reflectance with respect to the light entering the half mirror layer 25 at the incidence angle of 0 degree between the first wavelength band and the second wavelength band.

In general, the dielectric multilayer film has a characteristic that the peak of the reflection spectrum is shifted toward the short-wavelength side in the case of oblique incidence. By designing the half mirror layer 25 in the present embodiment so that the peak P1 of the reflectance with respect to the light entering the half mirror layer 25 at the incidence angle of 0 degree exists between the first wavelength band and the second wavelength band, the peak of the reflectance spectrum of the first light B which obliquely enters half mirror layer 25 is shifted toward the short wavelength side to thereby realize the predetermined reflectance angular characteristic.

The half mirror layer 25 in the present embodiment is disposed on the structure 24 including the plurality of scattering structures 24a each having a lens shape. Therefore, the surface shape of the half mirror layer 25 has a spherical shape copying the surface shape of the structure 24.

Figure 5:
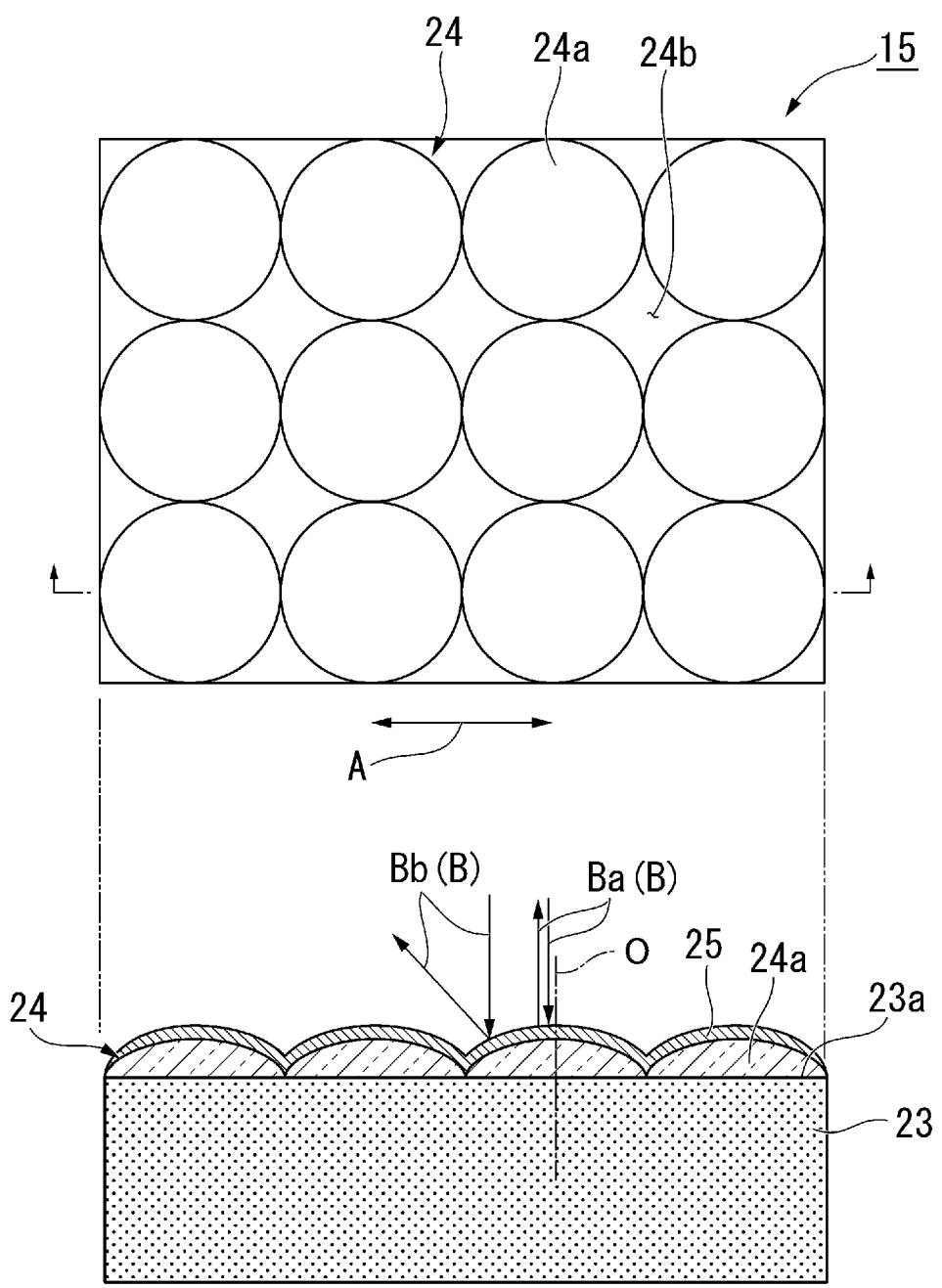
FIG. 5 is an explanatory diagram of first light to be reflected by the wavelength conversion element.

FIG. 5 is an enlarged view of an essential part for explaining the first light B to be reflected by the wavelength conversion element 15. In FIG. 5, an axis passing through the center of the scattering structure 24a formed of a lens shape is defined as a central axis O, and a direction perpendicular to the central axis O is defined as a first direction A. In an upper part of FIG. 5, the half mirror layer 25 is omitted in order to make the drawing eye-friendly.

As shown in FIG. 5, when defining the first light B having entered the half mirror layer 25 which covers a position close to the central axis O in the first direction A as first light Ba, the incidence angle with respect to the half mirror layer 25 in the first light Ba becomes about 0 degree.

In contrast, when defining the first light B having entered the half mirror layer 25 which covers a position apart from the central axis O in the first direction A as first light Bb, the incidence angle with respect to the half mirror layer 25 in the first light Bb becomes larger than 0 degree. In other words, as getting away in the first direction A from the central axis O, the incidence angle with respect to the half mirror layer 25 in the first light Bb increases.

As shown in FIG. 5, in the wavelength conversion element 15 according to the present embodiment, the larger the incidence angle with respect to the half mirror layer 25 is, the larger the angle the tilt of the reflection direction of the first light B forms with respect to the perpendicular direction.

As shown in FIG. 5, the structure 24 in the present embodiment is configured by arranging the plurality of scattering structures 24a having the same shape on the upper surface 23a of the wavelength conversion layer 23 at an equal pitch. In the structure 24 in the present embodiment, the planar shape of each of the scattering structures 24a is made to have a circle. Therefore, the gaps between the scattering structures 24a form a plane 24b.

In the wavelength conversion element 15 according to the present embodiment, the first light B enters the half mirror layer 25 disposed on the structure 24 at a variety of angles and from a variety of directions. Therefore, the first light B includes an S-polarization component which enters the half mirror layer 25 as S-polarized light, and a P-polarization component which enters the half mirror layer 25 as P-polarized light. It should be noted that it is conceivable that the proportions of the S-polarization component and the P-polarization component included in the first light B are equivalent.

Therefore, in the wavelength conversion element 15 according to the present embodiment, it can be assumed that the first light B enters the half mirror layer 25 as unpolarized light. Further, regarding the second light Y generated in the wavelength conversion layer 23, similarly to the first light B, it can be assumed that the second light Y enters the half mirror layer 25 as unpolarized light including the S-polarization component and the P-polarization component.

Figure 6:
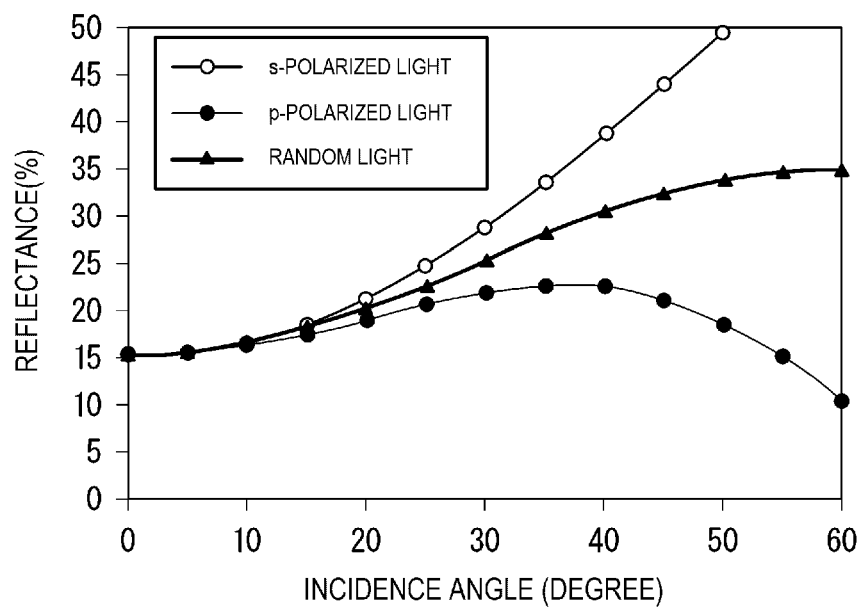
FIG. 6 is a diagram showing a reflectance angular characteristic of the half mirror layer in the first light.

FIG. 6 is a diagram showing a reflectance angular characteristic of the half mirror layer 25 in the first light B. In FIG. 6, the horizontal axis represents the incidence angle of the first light B, and the vertical axis represents the reflectance. FIG. 6 shows the reflectance angular characteristic when the first light B enters the half mirror layer 25 as the S-polarized light, the reflectance angular characteristic when the first light B enters the half mirror layer 25 as the P-polarized light, and the reflectance angular characteristic when the first light B enters the half mirror layer 25 as the unpolarized light. It should be noted that the reflectance angular characteristic when the first light B enters the half mirror layer 25 as the unpolarized light is calculated from an average value of the reflectance when the first light B enters the half mirror layer 25 as the S-polarized light and the reflectance when the first light B enters the half mirror layer 25 as the P-polarized light.

As shown in FIG. 6, the reflectance when the first light B which enters the half mirror layer 25 as the unpolarized light enters the half mirror layer 25 at the incidence angle of 0 degree, namely from the perpendicular direction, is about 15%. Further, as the incidence angle becomes larger than 0 degree, the reflectance of the first light B increases. In other words, the half mirror layer 25 in the present embodiment has the reflectance angular characteristic that the larger the incidence angle with respect to the half mirror layer 25 of the first light B is, the larger the reflectance of the half mirror layer 25 with respect to the first light B becomes when the first light B is assumed to enter the half mirror layer 25 as the unpolarized light.

The wavelength conversion element 15 according to the present embodiment having the configuration described above reflects relatively large proportion of the first light B which has entered the half mirror layer 25 at a large incidence angle, and reflects relatively small proportion of the first light B which has entered the half mirror layer 25 at a small incidence angle. The larger the incidence angle to the half mirror layer 25 is, the more the oblique direction of the reflection of the first light B gets away from the perpendicular direction as described above. In other words, according to the wavelength conversion element 15 related to the present embodiment, a larger amount of the first light B is reflected toward the oblique direction than the amount of the first light B reflected toward the perpendicular direction.

Then, a light distribution characteristic of the first light which is scattered and reflected by the wavelength conversion element 15 according to the present embodiment will be described. A part of the first light B which scattered and reflected by the wavelength conversion element 15 out of the first light B which has entered the wavelength conversion element 15 will hereinafter be referred to as scattered reflected light B1.

Figure 7:
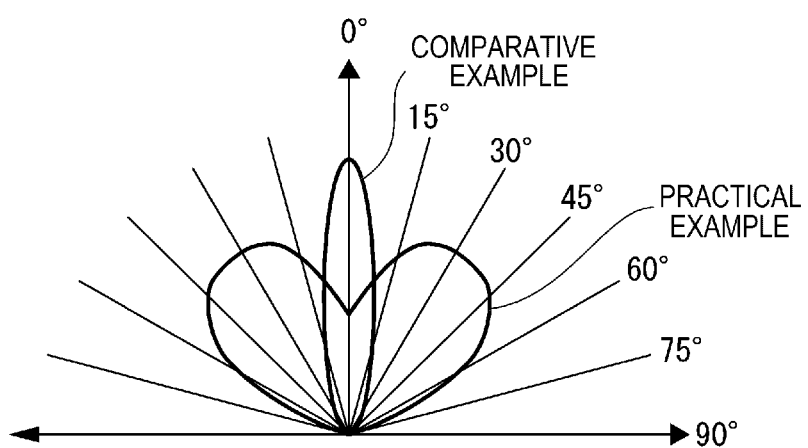
FIG. 7 is a diagram showing a light distribution characteristic of scattered reflected light in the wavelength conversion element.

FIG. 7 is a diagram showing the light distribution characteristic of the scattered reflected light B1 in the wavelength conversion element 15 according to the present embodiment. In FIG. 7, the vertical axis defines the light distribution in a 0-degree direction in the scattered reflected light B1, and the horizontal direction defines the light distribution in ±90-degree directions in the scattered reflected light B1. It should be noted that in FIG. 7, the light distribution characteristic of the wavelength conversion element 15 according to the present embodiment is shown as a practical example, and the light distribution characteristic of a wavelength conversion element which is provided only with the structure 24 made of $TiO_2$ disposed on the upper surface 23a of the wavelength conversion layer 23 but is not provided with the half mirror layer 25 is illustrated as a comparative example.

As shown in FIG. 7, in the wavelength conversion element according to the comparative example, it is understood that there is a large amount of component reflected and emitted in the 0-degree direction, namely the perpendicular direction, in the light distribution of the scattered reflected light B1. In contrast, in the wavelength conversion element 15 according to the present embodiment, it is understood that the light having the light distribution including a larger amount of component in the oblique direction in a range of 15 through 60 degrees than in the perpendicular direction along the 0-degree direction is emitted as the scattered reflected light B1.

As shown in FIG. 3, the wavelength conversion element 15 according to the present embodiment reflects a larger amount of the scattered reflected light B1 toward the oblique direction than toward the perpendicular direction. It should be noted that in FIG. 3, in order to make the drawing easy to understand, the scattered reflected light B1 in the oblique direction is represented thicker in beam width than the scattered reflected light B1 in the perpendicular direction.

Figure 8:
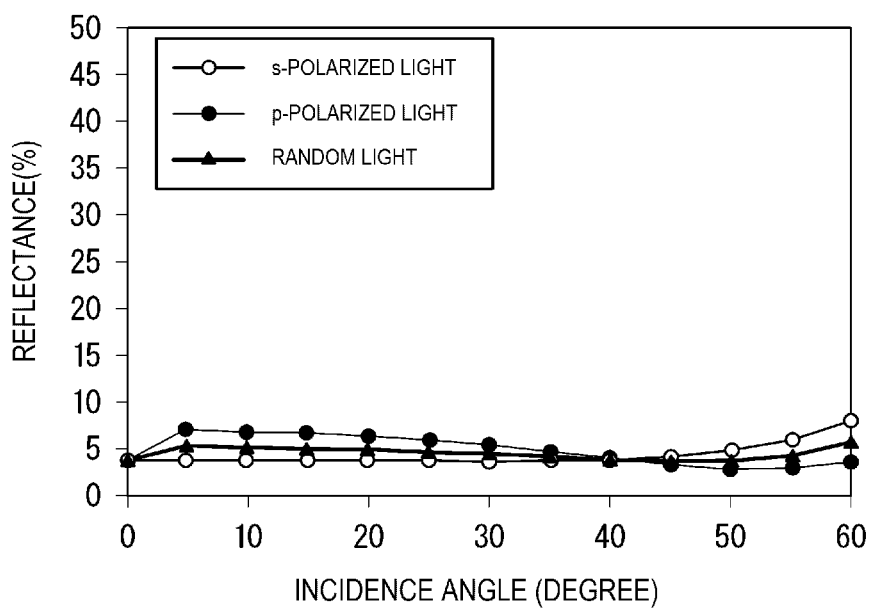
FIG. 8 is a diagram showing a reflectance angular characteristic of the half mirror layer in second light.

FIG. 8 is a diagram showing a reflectance angular characteristic of the half mirror layer 25 in the second light Y. In FIG. 8, the horizontal axis represents the incidence angle of the second light Y, and the vertical axis represents the reflectance. FIG. 8 shows the reflectance angular characteristic when the second light Y enters the half mirror layer 25 as the S-polarized light, the reflectance angular characteristic when the second light Y enters the half mirror layer 25 as the P-polarized light, and the reflectance angular characteristic when the second light Y enters the half mirror layer 25 as the unpolarized light. It should be noted that the reflectance angular characteristic when the second light Y enters the half mirror layer 25 as the unpolarized light is calculated from an average value of the reflectance when the second light Y enters the half mirror layer 25 as the S-polarized light and the reflectance when the second light Y enters the half mirror layer 25 as the P-polarized light.

As shown in FIG. 8, it is understood that the reflectance of the second light Y which enters the half mirror layer 25 as the unpolarized light is as low as about 5% irrespective of the incidence angle. It should be noted that since the structure 24 in the present embodiment is formed of a material low in light absorption, the reflection of the second light Y by the surface of the structure 24 is suppressed.

Therefore, in the wavelength conversion element 15 according to the present embodiment, the second light Y generated in the wavelength conversion layer 23 is transmitted through the structure 24 and the half mirror layer 25, and is then efficiently emitted to the outside.

The wavelength conversion element 15 according to the present embodiment emits the illumination light WL having a white color including the scattered reflected light B1 and the second light Y toward the second optical system 14. The illumination light WL is substantially collimated by the second optical system 14. The illumination light WL having been transmitted through the second optical system 14 passes through the dichroic mirror 13 disposed on the illumination light axis AX.

Here, the dichroic mirror 13 has an optical characteristic of reflecting the first light B and at the same time transmitting the second light Y. Therefore, the second light Y included in the illumination light WL is transmitted through the dichroic mirror 13, and then proceeds toward the homogenized illumination optical system 16. Since the second light Y is transmitted through the dichroic mirror 13, it is possible to reduce the light loss of the second light Y due to the dichroic mirror 13.

On the other hand, the scattered reflected light B1 included in the illumination light WL is the light in the first wavelength band the same as the wavelength band of the first light B, and is therefore reflected by the dichroic mirror 13. In the present embodiment, the scattered reflected light B1 included in the illumination light WL has the light distribution including a larger amount of component in the oblique direction than in the perpendicular direction as described above. Therefore, a large proportion of the light beam included in the scattered reflected light B1 proceeds toward the homogenized illumination optical system 16 so as to avoid the dichroic mirror 13 located in the perpendicular direction of the wavelength conversion element 15.

Thus, since the light intensity of the scattered reflected light B1 which enters the dichroic mirror 13 is suppressed, it is possible to reduce the proportion of the scattered reflected light B1 which is reflected by the dichroic mirror 13 and is therefore not efficiently used as the illumination light WL. In the present embodiment, by making the first light B enter the dichroic mirror 13 in the condensed state, the dichroic mirror 13 is reduced in size. Therefore, it is possible to further reduce the light intensity of the scattered reflected light B1 which enters the dichroic mirror 13.

The homogenized illumination optical system 16 which the illumination light WL enters includes an integrator optical system 31, a polarization conversion element 32, and a superimposing optical system 33. The integrator optical system 31 is provided with a first multi-lens array 31a and a second multi-lens array 31b.

The polarization conversion element 32 is constituted by polarization split films and wave plates arranged in an array. The polarization conversion element 32 uniforms the polarization direction of the illumination light WL into a predetermined direction. Specifically, the polarization conversion element 32 uniforms the polarization direction of the illumination light WL into a direction of a transmission axis of the incident side polarization plate of each of the light modulation devices 4R, 4G, and 4B.

Thus, the polarization direction of the red light LR, the green light LG, and the blue light LB obtained by separating the illumination light WL having been transmitted through the polarization conversion element 32 coincides with the transmission axis direction of the incident side polarization plate of each of the light modulation devices 4R, 4G, and 4B. Therefore, the red light LR, the green light LG, and the blue light LB enter the image formation areas of the light modulation devices 4R, 4G, and 4B, respectively, without being blocked by the incident side polarization plates, respectively.

The superimposing optical system 33 forms images of the respective small lenses of the first multi-lens array 31a in the vicinity of each of the image formation areas of the respective light modulation devices 4R, 4G, and 4B in cooperation with the second multi-lens array 31b.

According to the illumination device 2 related to the present embodiment, it is possible to increase the light use efficiency of the illumination light WL, and thus, it is possible to increase the luminance of the illumination light WL and reduce the power consumption, or suppress heat generation in the device due to the light loss.

Advantages of First Embodiment

The wavelength conversion element 15 according to the present embodiment is provided with the substrate 21 having the first surface 21a, the reflecting layer 22 disposed on the first surface 21a, the wavelength conversion layer 23 which is disposed on the reflecting layer 22, and converts the first light B in the first wavelength band into the second light Y in the second wavelength band different from the first wavelength band, the structure 24 which is disposed on the wavelength conversion layer 23, and scatters the first light B in the first wavelength band, and the half mirror layer 25 which is disposed on the structure 24, reflects a part of the first light B in the first wavelength band, transmits another part of the first light B in the first wavelength band, and transmits the second light Y in the second wavelength band, wherein the half mirror layer 25 is different in reflectance with respect to the first light B in the first wavelength band in accordance with the incidence angle of the first light B in the first wavelength band entering the half mirror layer 25.

According to the wavelength conversion element 15 related to the present embodiment, since the half mirror layer 25 different in reflectance with respect to the first light B in accordance with the incidence angle of the first light B is disposed on the structure 24, it is possible to generate the scattered reflected light B1 having the light distribution including a larger amount of component proceeding toward the oblique direction than toward the perpendicular direction. Thus, since the scattered reflected light B1 is emitted so as to avoid the dichroic mirror 13 disposed in the perpendicular direction with respect to the wavelength conversion element 15, it is possible to reduce the light loss caused by the dichroic mirror 13.

In the wavelength conversion element 15 according to the present embodiment, the incidence angle is defined as an angle formed with the direction perpendicular to the half mirror layer 25, and it is possible to adopt a configuration in which the larger the incidence angle is, the higher the reflectance of the half mirror layer 25 with respect to the first light B in the first wavelength band is.

According to this configuration, it is possible to generate the scattered reflected light B1 having the light distribution including a larger amount of component in the oblique direction than in the perpendicular direction as described above.

In the wavelength conversion element 15 according to the present embodiment, when assuming that the first light B in the first wavelength band enters the half mirror layer as the unpolarized light, it is possible to adopt a configuration in which the larger the incidence angle is, the higher the reflectance with respect to the first light B in the first wavelength band is.

By assuming that the first light B enters the half mirror layer 25 as the unpolarized light as described above, it becomes easy to design the half mirror layer 25.

In the wavelength conversion element 15 according to the present embodiment, it is possible to provide the structure 24 with a configuration having a plurality of scattering structures 24a each formed of at least either one of a recessed part or a protruding part.

According to this configuration, it is possible to scatter the first light B with the structure 24 having the plurality of scattering structures 24a to generate the scattered reflected light B1.

In the wavelength conversion element 15 according to the present embodiment, it is possible to adopt a configuration in which the scattering structures 24a each have the lens shape.

Since the scattering structures 24a each having the lens shape can easily be manufactured, it is possible to reduce the cost of the structure 24. Further, since the scattering structures 24a each have the lens shape, the process of depositing the half mirror layer 25 on the structure 24 becomes easy.

In the wavelength conversion element 15 according to the present embodiment, it is possible to adopt a configuration in which the reflectance of the half mirror layer 25 with respect to light perpendicularly entering the half mirror layer 25 has a peak between the first wavelength band and the second wavelength band.

According to this configuration, it is possible to form the half mirror layer 25 in which the peak of the reflection spectrum of the first light B which obliquely enters the half mirror layer 25 is shifted toward the short wavelength side. Thus, the first light B which has entered the half mirror layer 25 from the oblique direction at a large incidence angle can be reflected at high reflectance as the scattered reflected light B1.

In the wavelength conversion element 15 according to the present embodiment, it is possible to adopt a configuration in which the half mirror layer 25 is formed of a material having the refraction index in the range of 1.3 through 2.5.

According to this configuration, it is possible to form the structure 24 with a material which is low in light absorption and is chemically stable.

In the wavelength conversion element 15 according to the present embodiment, it is possible for the half mirror layer 25 to be formed of a dielectric multilayer film.

According to this configuration, it is possible to form the half mirror layer 25 with the light absorption suppressed.

In the wavelength conversion element 15 according to the present embodiment, it is possible to adopt a configuration in which the dielectric multilayer film includes one of $MgF_2$, $SiO_2$, $Al_2O_3$, $Y_2O_3$, $CeO_2$, $HfO_2$, $La_2O_3$, $ZrO_2$, $Ta_2O_5$, $Nb_2O_5$, and $TiO_2$.

According to this configuration, it is possible to form the half mirror layer 25 which suppresses the light absorption, and is at the same time chemically stable.

The illumination device 2 according to the present embodiment is provided with the wavelength conversion element 15 described above, the light source 11 for emitting the first light B in the first wavelength band, and the dichroic mirror 13 for reflecting the first light B in the first wavelength band emitted from the light source 11, toward the wavelength conversion element 15.

According to the illumination device 2 related to the present embodiment, since the light intensity of the scattered reflected light which enters the dichroic mirror 13 is suppressed, it is possible to increase the light use efficiency of the illumination light WL.

In the illumination device 2 according to the present embodiment, it is possible for the dichroic mirror 13 to have a configuration of transmitting the second light Y in the second wavelength band.

According to this configuration, it is possible to reduce the light loss of the second light Y caused by the dichroic mirror 13.

The projector 1 according to the present embodiment is provided with the illumination device 2, the light modulation devices 4R, 4G, and 4B for modulating the light from the illumination device 2 in accordance with the image information, and the projection optical device 6 for projecting the light modulated by the light modulation devices 4B, 4G, and 4R.

According to the projector 1 related to the present embodiment, since there is provided the illumination device 2 increased in light use efficiency of the illumination light WL, it is possible to provide the projector which is high in light efficiency, and displays a bright image.

MODIFIED EXAMPLES

Then, some modified examples of the wavelength conversion element will be described. The wavelength conversion element according to the present modified example is different in configuration of the structure from the wavelength conversion element 15 according to the embodiment described above. Hereinafter, a configuration of the structure will mainly be described. It should be noted that members common to the embodiment described above will be denoted by the same reference symbols, and the detailed description thereof will be omitted.

Figure 9:
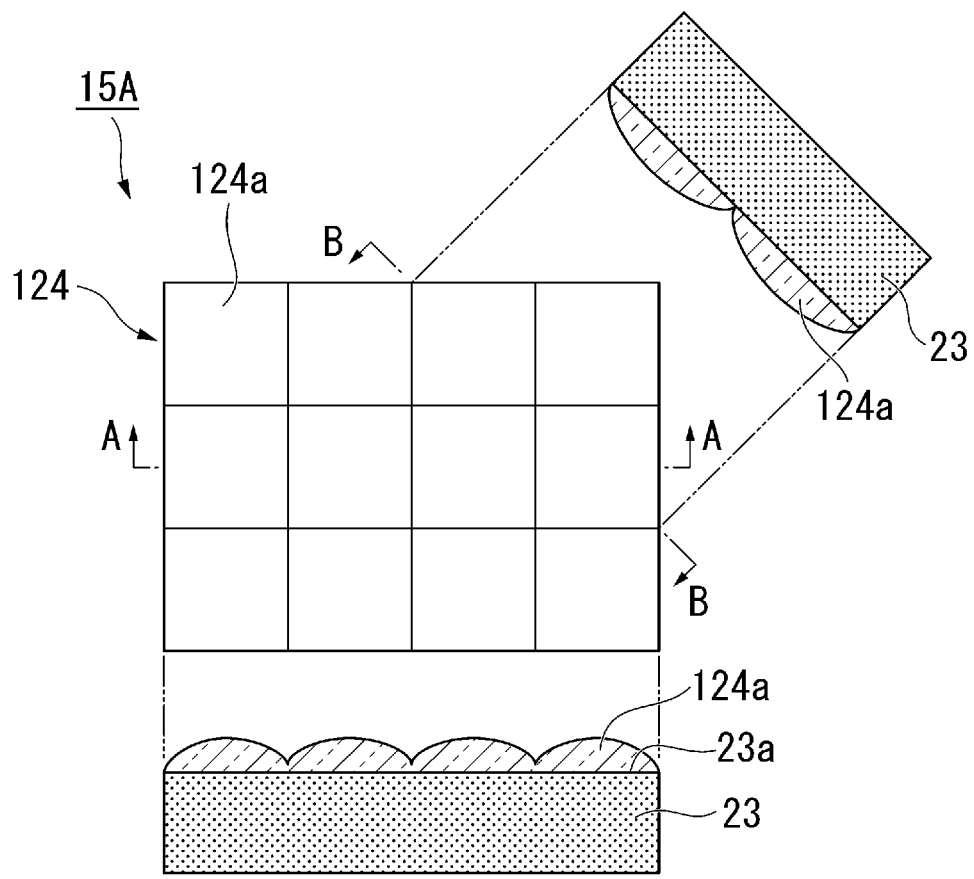
FIG. 9 is a diagram showing a configuration of a wavelength conversion element according to a modified example.

FIG. 9 is a diagram showing a configuration of the wavelength conversion element 15A according to the present modified example.

As shown in FIG. 9, in the wavelength conversion element 15A according to the present modified example, the structure 124 includes a plurality of scattering structures 124a. The planar shape of each of the scattering structures 124a is a square shape.

In FIG. 9, there are shown a cross-sectional structure of the structure 124 viewed from the arrow A-A along a direction in which the plurality of scattering structures 124a is arranged, and a cross-sectional structure of the structure 124 viewed from the arrow B-B along an diagonal direction of the scattering structure 124a having a square shape in addition to a planar configuration of the structure 124.

As shown in the cross-sectional surface along the A-A line in FIG. 9, a cross-sectional shape in a direction along a side of the square shape of the scattering structure 124a has a convex-lens shape. Further, as shown in the cross-sectional surface along the B-B line in FIG. 9, a cross-sectional shape in the diagonal direction of the square shape of the scattering structure 124a also has a convex-lens shape. It should be noted that in the scattering structure 124a, the curvature of the convex-lens surface shown in the cross-sectional surface along the B-B line is lower than the curvature of the convex-lens surface shown in the cross-sectional surface along the A-A line.

By tightly arranging the plurality of scattering structures 124a, the structure 124 in the present modified example is provided with a rectangular planar shape as a whole. Therefore, the structure 124 in the present modified example does not have such a plane 24b as in the structure 24 according to the embodiment described above, but is formed on the entire upper surface 23a of the wavelength conversion layer 23. It should be noted that the scattering structures 124a can be separated from each other, or can also be formed integrally.

Figure 10:
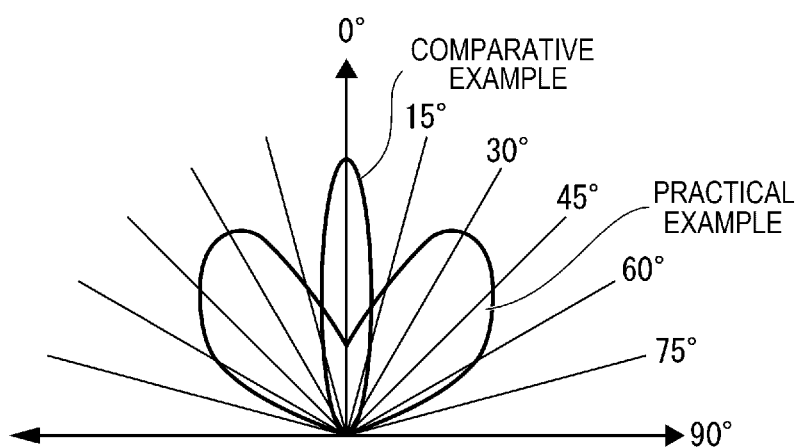
FIG. 10 is a diagram showing a light distribution characteristic of scattered reflected light in the modified example.

FIG. 10 is a diagram showing a light distribution characteristic of the scattered reflected light B1 in the wavelength conversion element 15A according to the present modified example. FIG. 10 is a diagram corresponding to FIG. 7 in the embodiment described above. It should be noted that in FIG. 10, the light distribution characteristic of the wavelength conversion element 15A according to the present modified example is shown as a practical example, and the light distribution characteristic of a wavelength conversion element which is provided only with the structure 124 disposed on the upper surface 23a of the wavelength conversion layer 23 but is not provided with the half mirror layer 25 is illustrated as a comparative example.

As shown in FIG. 10, according to the wavelength conversion element 15A related to the present modified example, it is understood that the light intensity of the scattered reflected light B1 emitted toward the perpendicular direction is lower than in the wavelength conversion element 15 according to the embodiment described above. This derives from the fact that the structure 124 in the wavelength conversion element 15A according to the present modified example does not have the plane part as described above, but is formed on the entire upper surface 23a of the wavelength conversion layer 23, thus the intensity of the light to be reflected toward the perpendicular direction is relatively reduced.

According to the wavelength conversion element 15A related to the present modified example, the light intensity of the scattered reflected light B1 which enters the dichroic mirror 13 is further suppressed. Therefore, it is possible for the illumination device using the wavelength conversion element 15A according to the present modified example to further increase the light use efficiency of the illumination light WL.

It should be noted that the scope of the present disclosure is not limited to the embodiments described above, but a variety of modifications can be provided thereto within the scope or the spirit of the present disclosure.

Figure 11:
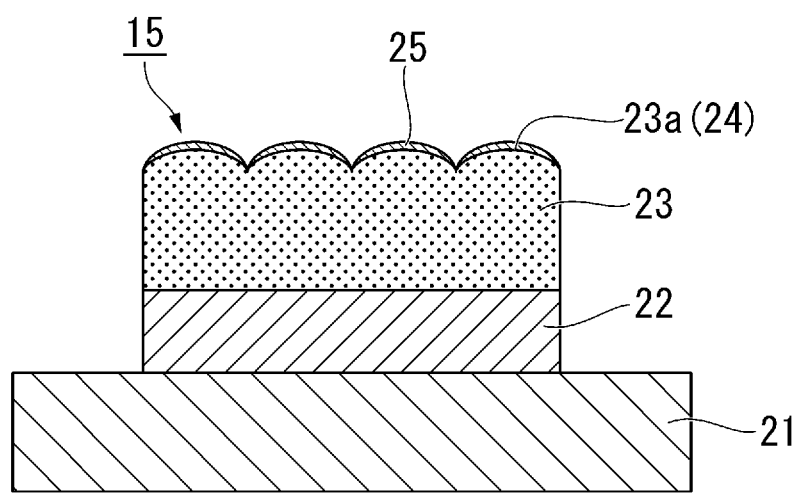
FIG. 11 is a diagram showing a configuration in which a structure and a wavelength conversion layer are formed integrally.

For example, although the structure 24 is formed separately from the wavelength conversion layer 23 in the embodiment described above, the structure 24 can be formed integrally with the wavelength conversion layer 23. FIG. 11 is a diagram showing a configuration in which the structure 24 and the wavelength conversion layer 23 are formed integrally. As shown in FIG. 11, according to the configuration in which the structure 24 is directly formed on the upper surface 23a of the wavelength conversion layer 23, it is possible to eliminate the process of forming the structure 24, and thus, it is possible to reduce the cost of the wavelength conversion element 15. Further, since the structure 24 and the wavelength conversion layer 23 are the same in refractive index, the interface reflection between the structure 24 and the wavelength conversion layer 23 is eliminated, and thus, it becomes difficult for the light to leak in the lateral direction, and as a result, the etendue can be made small.

Further, the shape of the scattering structure 24a is not limited to the lens shape, but can also be a recessed part such as a concave-lens shape. Further, although the plurality of scattering structures 24a has the structures the same in shape arranged at the equal pitch in the embodiment described above, it is possible to randomly arrange the scattering structures the same or different in shape to constitute the structure 24.

Further, the stationary structure in which the wavelength conversion layer 23 does not move with respect to the first light B is adopted in the wavelength conversion element 15 in the embodiment described above, but it is possible to adopt a wheel type structure in which the wavelength conversion layer 23 rotates with respect to the first light B.

Besides the above, the specific descriptions of the shape, the number, the arrangement, the material, and so on of the constituents of the light source device and the projector are not limited to those in the embodiments described above, but can arbitrarily be modified. Although in the embodiments described above, there is described the example of installing the light source device according to the present disclosure in the projector using the liquid crystal light valves, the example is not a limitation. The light source device according to the present disclosure can also be applied to a projector using digital micromirror devices as the light modulation devices. Further, the projector is not required to have a plurality of light modulation devices, and can be provided with just one light modulation device.

Although in the embodiments described above, there is described the example of applying the light source device according to the present disclosure to the projector, the example is not a limitation. The light source device according to the present disclosure can also be applied to lighting equipment, a headlight of a vehicle, and so on.

It is also possible for a wavelength conversion element according to an aspect of the present disclosure to have the following configuration.

The wavelength conversion element according to an aspect of the present disclosure includes a substrate having a first surface, a reflecting layer provided to the first surface, a wavelength conversion layer which is disposed on the reflecting layer, and which is configured to convert light in a first wavelength band into light in a second wavelength band different from the first wavelength band, a structure which is disposed on the wavelength conversion layer, and which is configured to scatter the light in the first wavelength band, and an optical layer which is disposed on the structure, and which is configured to reflect a part of the light in the first wavelength band, transmit another part of the light in the first wavelength band, and transmit the light in the second wavelength band, wherein the optical layer is different in reflectance with respect to the light in the first wavelength band in accordance with an incidence angle of the light in the first wavelength band entering the optical layer.

In the wavelength conversion element according to the aspect of the present disclosure, the incidence angle may be defined by an angle formed with a direction perpendicular to the optical layer, and the larger the incidence angle is, the higher the reflectance of the optical layer with respect to the light in the first wavelength band may be.

In the wavelength conversion element according to the aspect of the present disclosure, when the light in the first wavelength band is unpolarized light with respect to the optical layer, the larger the incidence angle is, the higher the reflectance of the optical layer with respect to the light in the first wavelength band may be.

In the wavelength conversion element according to the aspect of the present disclosure, the structure may have a plurality of scattering structures formed of at least one of a recessed part and a protruding part.

In the wavelength conversion element according to the aspect of the present disclosure, the scattering structure may have a lens shape.

In the wavelength conversion element according to the aspect of the present disclosure, the reflectance of the optical layer with respect to light perpendicularly entering the optical layer may have a peak between the first wavelength band and the second wavelength band.

In the wavelength conversion element according to the aspect of the present disclosure, the structure may be formed of a material having a refractive index in a range of 1.3 through 2.5.

In the wavelength conversion element according to the aspect of the present disclosure, the optical layer may be formed of a dielectric multilayer film.

In the wavelength conversion element according to the aspect of the present disclosure, the dielectric multilayer film may include one of $MgF_2$, $SiO_2$, $Al_2O_3$, $Y_2O_3$, $CeO_2$, $HfO_2$, $La_2O_3$, $ZrO_2$, $Ta_2O_5$, $Nb_2O_5$, and $TiO_2$.

In the wavelength conversion element according to the aspect of the present disclosure, the structure may be formed integrally with a phosphor.

It is also possible for a light source device according to another aspect of the present disclosure to have the following configuration.

The light source device according to the aspect of the present disclosure includes the wavelength conversion element according to the aspect of the present disclosure, a light source configured to emit the light in the first wavelength band, and a reflecting member configured to reflect the light in the first wavelength band emitted from the light source, toward the wavelength conversion element.

In the light source device according to the aspect of the present disclosure, the reflecting member may transmit the light in the second wavelength band.

It is also possible for a projector according to another aspect of the present disclosure to have the following configuration.

The projector according to another aspect of the present disclosure includes the illumination device according to the aspect of the present disclosure, a light modulation device configured to modulate the light from the illumination device in accordance with image information, and a projection optical device configured to project the light modulated by the light modulation device.

What is claimed is:

1. A wavelength conversion element comprising:
    a substrate having a first surface;
    a reflecting layer provided to the first surface;
    a wavelength conversion layer which is disposed on the reflecting layer, and which is configured to convert light in a first wavelength band into light in a second wavelength band different from the first wavelength band;
    a structure which is disposed on the wavelength conversion layer, and which is configured to scatter the light in the first wavelength band; and
    an optical layer which is disposed on the structure, and which is configured to reflect a part of the light in the first wavelength band, transmit another part of the light in the first wavelength band, and transmit the light in the second wavelength band, wherein
    the optical layer is different in reflectance with respect to the light in the first wavelength band in accordance with an incidence angle of the light in the first wavelength band entering the optical layer,
    the incidence angle is defined by an angle formed with a direction perpendicular to the optical layer,
    the larger the incidence angle is, the higher the reflectance of the optical layer with respect to the light in the first wavelength band is, and
    when the light in the first wavelength band is unpolarized light with respect to the optical layer, the larger the incidence angle is, the higher the reflectance of the optical layer with respect to the light in the first wavelength band is.

2. The wavelength conversion element according to claim 1, wherein the structure has a plurality of scattering structures formed of at least one of a recessed part and a protruding part.

3. The wavelength conversion element according to claim 2, wherein
the scattering structure has a lens shape.

4. The wavelength conversion element according to claim 3, wherein
the reflectance of the optical layer with respect to light perpendicularly entering the optical layer has a peak between the first wavelength band and the second wavelength band.

5. The wavelength conversion element according to claim 2, wherein
the reflectance of the optical layer with respect to light perpendicularly entering the optical layer has a peak between the first wavelength band and the second wavelength band.

6. The wavelength conversion element according to claim 1, wherein
the reflectance of the optical layer with respect to light perpendicularly entering the optical layer has a peak between the first wavelength band and the second wavelength band.

7. The wavelength conversion element according to claim 1, wherein
the structure is formed of a material having a refractive index in a range of 1.3 through 2.5.

8. The wavelength conversion element according to claim 1, wherein
the optical layer is formed of a dielectric multilayer film.

9. The wavelength conversion element according to claim 8, wherein
the dielectric multilayer film includes one of $MgF_2$, $SiO_2$, $Al_2O_3$, $Y_2O_3$, $CeO_2$, $HfO_2$, $La_2O_3$, $ZrO_2$, $Ta_2O_5$, $Nb_2O_5$, and $TiO_2$.

10. The wavelength conversion element according to claim 1, wherein
the structure is formed integrally with the wavelength conversion layer.

11. An illumination device comprising:
the wavelength conversion element according to claim 1;
a light source configured to emit the light in the first wavelength band; and
a reflecting member configured to reflect the light in the first wavelength band emitted from the light source, toward the wavelength conversion element.

12. The illumination device according to claim 11, wherein
the reflecting member transmits the light in the second wavelength band.

13. A projector comprising:
the illumination device according to claim 12;
a light modulation device configured to modulate the light from the illumination device in accordance with image information; and
a projection optical device configured to project the light modulated by the light modulation device.

14. A projector comprising:
the illumination device according to claim 11;
a light modulation device configured to modulate the light from the illumination device in accordance with image information; and
a projection optical device configured to project the light modulated by the light modulation device.

* * * * *